Figure 1:
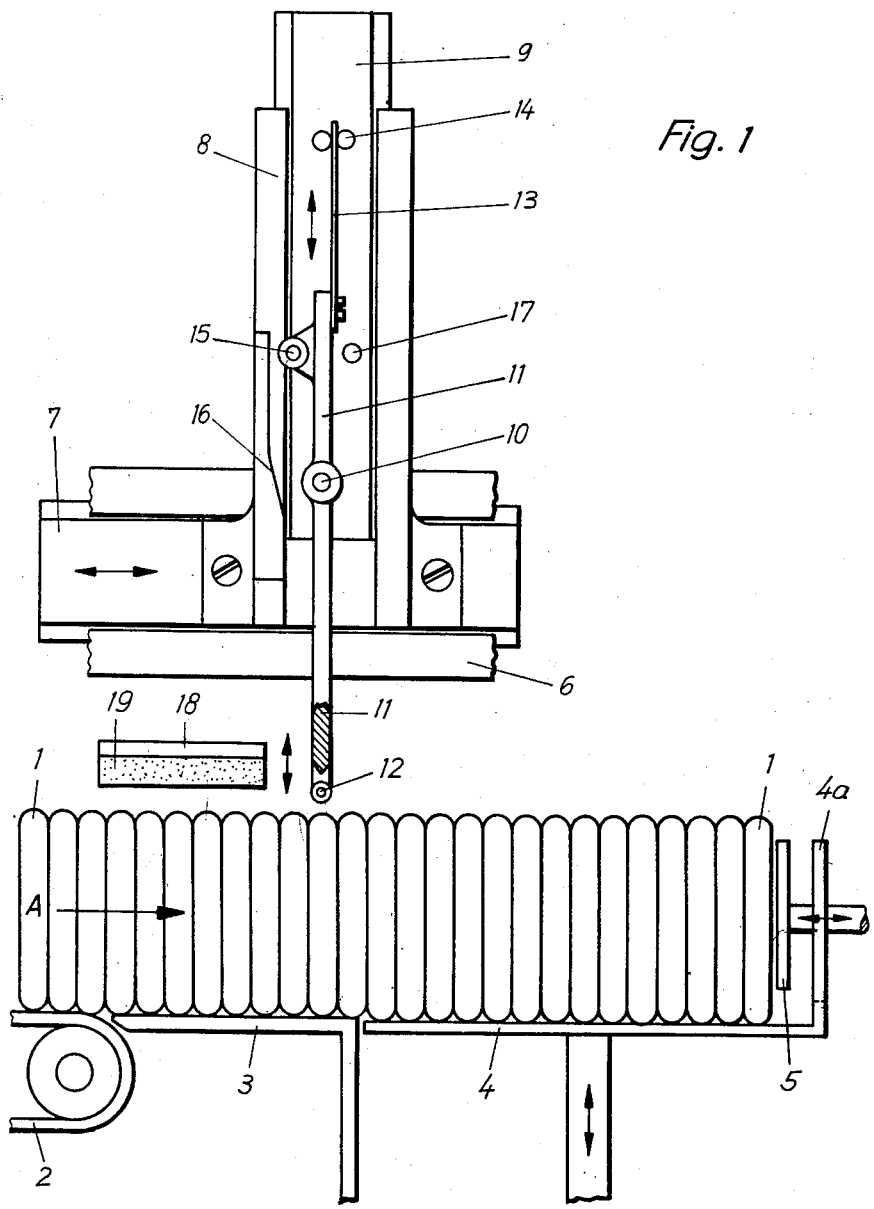

March 31, 1964 P. LUGINBÜHL 3,127,029
DEVICE FOR SEPARATING INDIVIDUAL GROUPS OF FLAT ARTICLES
Filed Nov. 28, 1961 2 Sheets-Sheet 1

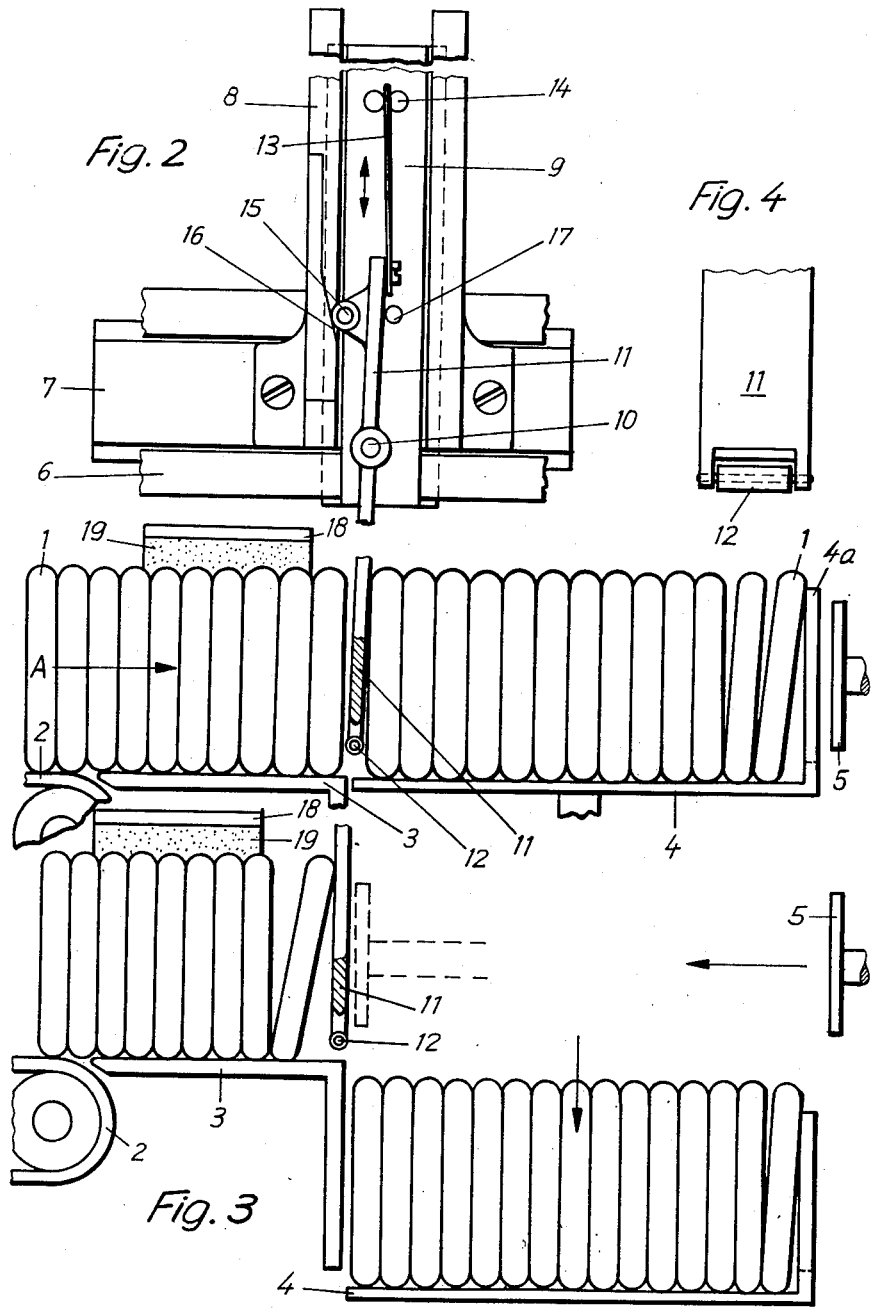

3,127,029
DEVICE FOR SEPARATING INDIVIDUAL GROUPS
OF FLAT ARTICLES
Pierre Luginbühl, Neuhausen am Rheinfall, Switzerland, assignor to Schweizerische Industrie-Gesellschaft, Neuhausen am Rheinfall, Switzerland
Filed Nov. 28, 1961, Ser. No. 155,422
Claims priority, application Switzerland Dec. 2, 1960
4 Claims. (Cl. 214—8.5)

This invention concerns a device for the separating of upright adjacent flat articles into individual groups fed continuously to a processing machine, such as a packing machine, by means of a displaceable separating member inserted between the articles.

It is already known in devices of this kind to arrange the displaceable separating member rigidly. It is therefore possible for the separating member during descent to damage articles by coming into contact with their upper surfaces, even if such surfaces have a rounded formation.

According to the present invention a device for separating individual groups of flat articles from a continuously advanced supply of such articles arranged in upright and adjacent relationship, comprises a carrier member movable towards and away from the path described by said continuously advanced supply of articles, a separating member pivotally mounted on said carrier member and displaceable by said carrier member to engage between two adjacent articles in said supply thereof, spring means engaging said separating member to urge the same towards a normal rest position, and locking means operable when said separating member is displaced into engagement between said adjacent articles for thereafter preventing further pivotal movement of said separating member on said carrier member.

The invention will be described further by way of example with reference to the accompanying generally diagrammatic drawings, in which:

FIG. 1 is a side elevation of part of device for separating biscuits into individual groups, FIG. 2 shows the device with a separating member inserted between two biscuits, FIG. 3 is a similar elevation of the lower part of the device of FIG. 1, showing a separated group of biscuits, and FIG. 4 is a detail in front elevation of a part of the separating member.

In the drawings, biscuits 1 are fed to the device, upright and adjacently disposed, by a conveyor belt 2. The biscuits immediately approaching the device are pushed by those behind them across a fixed plate 3. The foremost or leading biscuit is in contact with a horizontally displaceable stop member 5 when said stop member 5 is in its position (shown in FIGURE 3) in dash lines. When the stop member 5 is moved to the position shown in FIGURE 1 the biscuits will be fed across the table 4.

Journalled above the series of biscuits in a horizontal slide track 6 is a horizontal slide 7. The latter carries a vertical slide track 8 in which a carrier member in the form of a vertical slide 9 is displaceably arranged. A separating member 11 is mounted to pivot about a shaft 10 on the vertical slide 9 and carries a roller 12 at its lower end. Secured to its upper end is a leaf spring 13 which passes between two pins or rollers 14 mounted on the vertical slide 9. Thus although the separating member 11 is pivotable through a certain angle about the shaft 10, it is urged by the leaf spring 13 towards its centre or normal rest position in which it is exactly vertical.

Mounted on the separating member 11 is also a cam follower 15 which, as shown, may be a roller, while the vertical slide track 8 is provided with a fixed cam track 16 which co-operates with the cam follower 15. Disposed on the vertical slide 9 is a fixed abutment 17 for the separating member 11.

Viewed in the feed direction indicated by the arrow A, above the series of biscuits in front of the separating member 11, is provided a presser 18 which has a soft contact surface 19, for example, of sponge rubber and which can be lowered on to the biscuits to prevent forward movement thereof. The drive of the various displaceable members, the direction of movement of which is indicated by double-ended arrows, is not shown, and may be effected in any convenient conventional manner, for example by cam discs and pivotal levers.

The device proposed by the invention operates in the following manner.

When the receiving table 4, as shown in FIG. 1, is completely filled with biscuits and the stop member 5 has moved from its dash line in FIGURE 3 to the position shown in FIGURE 1, the presser 18 descends on to the row of biscuits on the plate 3 and holds them fast. Simultaneously, the stop member 5 is withdrawn into the position shown in FIG. 2 in which it is outside the wall 4a. This creates a clearance for the biscuits, with the result that they are no longer in close contact with one another. The separating member 11 then descends and engages between two biscuits. Since both the biscuits and the separating member 11 can move sideways, the separating member will penetrate between the biscuits without causing damage, even if the roller 12 contacts the centre of a rounded edge of a biscuit. When the separating member 11 reaches its lowest position (FIG. 2), the cam follower 15 moves on to the cam track 16 and the separating member 11 is thereby pivoted slightly and pressed against the abutment 17, so that it becomes fixed relative to the vertical slide 9 (FIG. 2), the horizontal slide 7 and hence member 11, then move in the feed direction and push the separated group of biscuits 1 in the direction of the receiving table 4. The latter then descends with the separated group of biscuits into the position shown in FIG. 3, from which the biscuits are fed by another slide (not shown) or the like to another processing station of the machine.

The stop 5 then moves to the left (FIG. 3) into the position shown in broken lines and the separating member 11 is raised. At the same time the presser 18 is raised from the biscuits and they are carried by the belt 2 to the right again until they engage the stop 5 which has since returned to its FIGURE 3 dotted line position. The stop 5 is pushed to the position shown in FIG. 1 the conveyor 2 feeds the biscuits onto the table 4 and prevents the biscuits falling over. A new cycle then begins with the lowering of the presser 18 the movement of the stop 5 to its FIGURE 2 position and the operation of the separating member 11.

In the embodiment described the narrow sides of the biscuits are rounded. If flat articles with plane frontal surfaces are to be separated into groups in such an apparatus they can be fed in a somewhat inclined, instead of a vertical position. In this manner the separating member 11 is enabled to penetrate between such articles.

As the biscuits 1 are fed by the conveyor 2 against the stop 5 in its dotted line position in FIGURE 3 the frictional force between the conveyor belt and the biscuits 1 is sufficient to force the biscuits 1 toward the right against the stop 5 and force the same toward its full line position in FIGURE 3. After the biscuits have engaged the vertical portion 4a of the table 4, movement of the series of biscuits is arrested and the continuously moving conveyor 2 slips beneath the biscuits resting on the surface thereof. While the biscuits are on the table 4 the stop member 5 is moved out of the path of the portion 4a and the dividing plate 11 is moved downwardly to separate the biscuits into two groups one of which is supported on the table 4 and the other ones on the conveyor 2 and table 3 as shown in FIGURE 2. The dividing plate 11 during its downward movement is shifted to the right (FIG. 1) on the slide 7 and as it approaches the limit of its downward movement is rocked about the pivot 10 by the cam roller 15 engaging the cam 16. This motion moves the last two or three biscuits ahead of the dividing plate 11 to the right so that descent of the table 4 will prevent the last biscuit to the left from engaging the edge of the table 3. The dividing plate 11 remains in its lowered position momentarily after the table 4 has been lowered and until the stop 5 has been moved to its dotted line position shown in FIGURE 3, whereupon the dividing plate is moved upwardly and out of the way and the conveyor 2 feeds the biscuits into engagement with the stop 5 while it is in its left hand position. During the interim the pad 19 is raised and lowered while the stack of biscuits are being moved across the table 4 by the conveyor 2 against the plunger 5 as above explained, and while the dividing plate 11 is lowered respectively.

I claim:

1. A device for separating flat articles into individual groups of substantially equal portions, comprising an endless conveyor for continuously moving said flat articles along a pathway toward one end of said conveyor with the articles arranged in side by side upright relation, a horizontal guide, a slide member positioned therein, a vertical guide connected to said horizontal guide, a carrier member slidably mounted in said vertical guide and positioned above said pathway adjacent said one end of said endless conveyor for vertical to and fro movement transversely of said pathway, a separating member pivotally mounted on said carrier and displaceable in either direction of movement along said pathway to engage between adjacent flat articles when said carrier member is moved downwardly, yielding spring means connected to said carrier and separating member to maintain said separating member in a normal vertical dead center rest position, and cooperating cam members positioned on said carrier and separating member operable when said separating member is in its lowered position to pivot said separating member and move the lower end thereof in a direction opposite to the direction of conveyor travel when the same is in position between two adjacent articles and a stop member positioned on said carrier, said cooperating cam members and said stop member being adapted to prevent movement of said separating member on said carrier member when the same is in its operative position.

2. In a device for separating flat articles into individual groups of substantially equal portions as set forth in claim 1, in which a roller is mounted on the lower free end of said separating member to guide the free end thereof into position between adjacent flat articles and arrest further movement of said articles along said conveyor pathway.

3. A device for separating flat articles into individual groups of substantially equal portions, as set forth in claim 1, in which a vertical movable table is located at the end of said conveyor pathway to receive the individual groups of flat articles after they have been divided by said separating member, said table being movable from a receiving position at the end of said conveyor to a discharge position while the articles retained by said separating member are arrested against movement along said pathway.

4. A device for separating flat articles into individual groups of substantially equal portions, as set forth in claim 3, in which a buffer member is movably mounted above said conveyor pathway and positioned near the end thereof, said buffer member being adapted to be moved vertically downward into engagement with a series of said articles adjacent said dividing member after said dividing member has moved to its lowered position to separate said group and thus hold the remaining flat articles in compact side by side edge relation.

References Cited in the file of this patent

UNITED STATES PATENTS

| | | |
|---|---|---|
| 1,149,377 | Loveren | Aug. 10, 1915 |
| 2,213,729 | Anderson | Sept. 3, 1940 |
| 2,252,937 | Link et al. | Aug. 19, 1941 |
| 2,678,151 | Geisler | May 11, 1954 |
| 2,753,974 | Hopton et al. | July 10, 1956 |
| 2,770,392 | Roberts | Nov. 13, 1956 |
| 2,788,156 | Cruzan | Apr. 9, 1957 |
| 2,954,881 | Hopton et al. | Oct. 4, 1960 |